Figure 1:
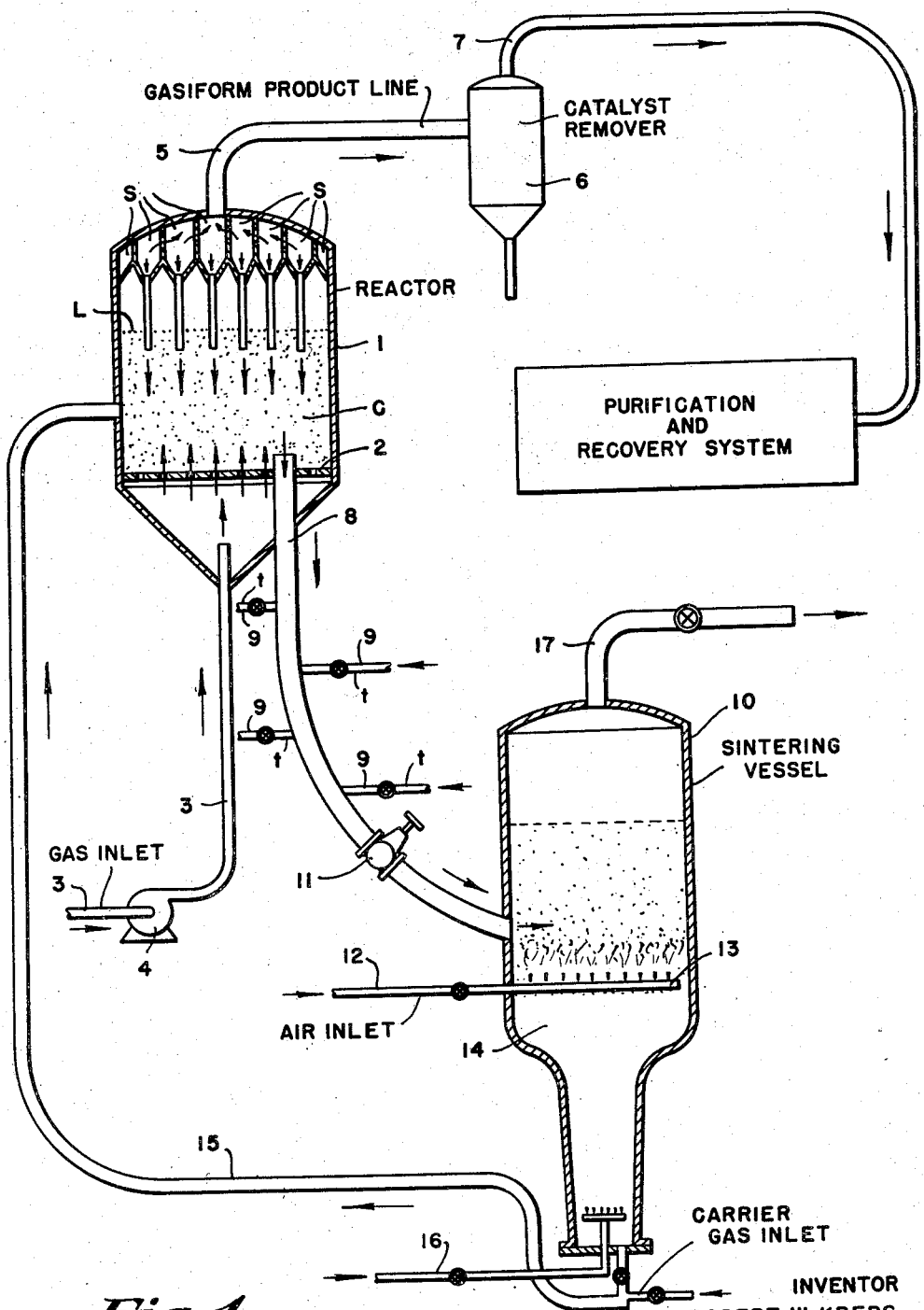
Figure 2:
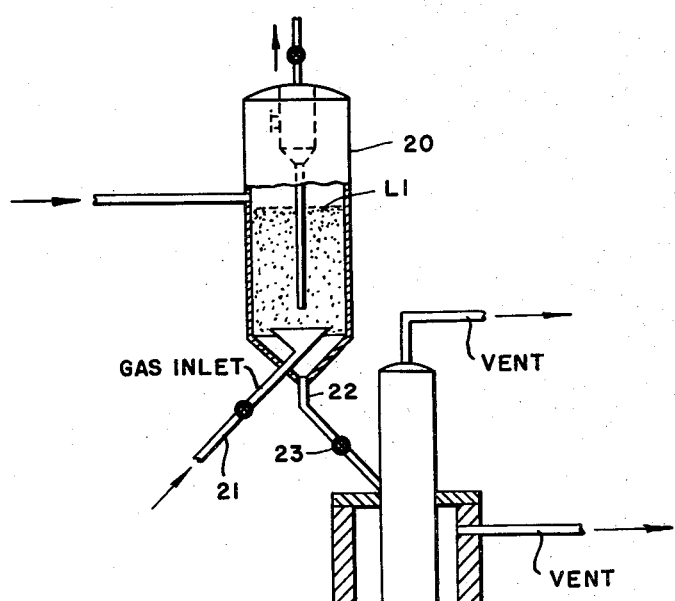
Figure 2:
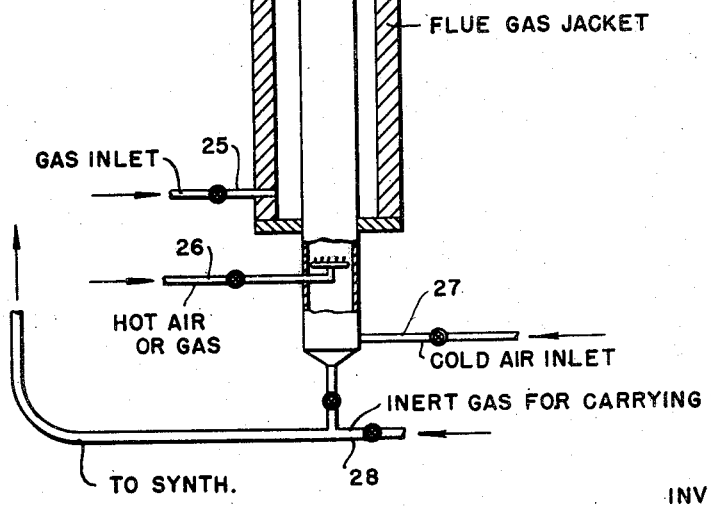

INVENTOR
ROBERT W. KREBS,
BY J. Cushman
ATTORNEY

June 6, 1950 R. W. KREBS 2,510,823
METHOD OF SINTERING A CATALYST
Filed June 30, 1947 2 Sheets-Sheet 2

INVENTOR
ROBERT W. KREBS,
BY J. Cashman
ATTORNEY

Patented June 6, 1950

2,510,823

UNITED STATES PATENT OFFICE 2,510,823

METHOD OF SINTERING A CATALYST

Robert W. Krebs, Baton Rouge, La., assignor to Standard Oil Development Company, a corporation of Delaware Application June 30, 1947, Serial No. 758,206

2 Claims. (Cl. 260—449.6)

My invention relates to improvements in the art of synthesizing hydrocarbons and oxygenated hydrocarbons employing a gaseous mixture containing carbon monoxide and hydrogen as the starting materials. In particular, my present invention relates to sintering or resintering a powdered iron catalyst which is used in the synthesis process.

It is a matter of record and commercial practice, in at least foreign countries, that normally liquid hydrocarbons may be synthesized by reducing carbon monoxide with hydrogen. This type of operation, particularly when the catalytic material is cobalt, is referred to in the literature as the Fischer-Tropsch process. Further investigation of the hydrocarbon synthesis process revealed that iron could be substituted for cobalt in the hydrocarbon synthesis. The earliest work done in this field was in reactors containing fixed or stationary beds of catalytic material.

More recently, the so-called "fluid catalyst technique" has been applied to the hydrocarbon synthesis process. In particular, the synthesis has been carried out in the presence of fluidized iron catalyst. The gasoline fraction obtained by the reduction of carbon monoxide with hydrogen in the presence of an iron catalyst is superior to the gasoline produced by the Fischer-Tropsch process employing the cobalt catalyst, in that the former has a much higher anti-detonation quality. Consequently, in the present state of development of this particular art, the manufacture, or synthesis of normally liquid hydrocarbons has been effected in the presence of the iron catalyst due, as stated, to the fact that where gasoline is the desired product, or one of the principal products, the iron-using process yields a more valuable product. The gasoline produced by the synthesis employing a cobalt catalyst is essentially composed of straight chain paraffinic compounds, and the same is true of the gas oil fraction. Both fractions, therefore, require subsequent treatment, such as reforming and/or cracking, to produce a satisfactory motor fuel. The gasoline produced using the iron catalyst in the hydrocarbon synthesis, when subjected to a rather mild after-treat such as a bauxite treat, yields a very high octane gasoline.

Experience, however, with the fluid catalyst technique employing powdered iron as the catalyst has presented certain problems, and one of the most serious of these problems is that the iron catalyst disintegrates physically to sizes of the order of 1 micron in diameter in extreme cases. This is a very undesirable characteristic of the process for it interferes with the fluidizing characteristics of the said iron catalyst. In other words, in order to maintain the iron catalyst in the form of a well-fluidized bed, no substantial portion of the catalyst should have a particle size below 10 microns and the major portion of the catalyst should have a particle size of at least 20 microns. In other words, a catalyst adapted for good fluidization is one which has the following particle size and distribution:

|  | Per cent |
|---|---|
| 0–20 microns | 0 to 35 |
| 20–40 microns | 5 to 25 |
| 40–80 microns | 5 to 25 |
| 80+ microns | 15 to 50 |

I have discovered that the iron catalyst which undergoes disintegration during use in the hydrocarbon synthesis may be agglomerated by sintering and simultaneously classified to a particle size within a satisfactory range in a manner which is efficient and economical, and the details of which sintering will be set forth more fully hereinafter.

Very briefly, I have found that I may re-work the iron fines which cannot be maintained in the reaction zone under ordinary fluidizable conditions because of their small particle size, by sintering them to form agglomerates which are large enough to be in the fluidizing range, say from 20 to 80 microns or up to 200 microns, and then to subject the sintered mass to elutriation or gaseous classification to separate the agglomerates of sufficient size to be well fluidized from the fines and to return the separated coarser particles to the reaction zone. Heretofore, it had been the practice to sinter iron to agglomerates which had to be ground to the proper size.

I have found means for accomplishing the sintering and agglomeration of the catalyst fines and the separation of the thus formed coarser material, which means comprises the use of a single vessel, the lower portion being of more restricted cross-sectional area than the upper portion, and in which vessel the sintering is performed while the iron fines are in the form of a fluidized bed. My invention is based on the discovery that very fine particles of iron tend to agglomerate even when at relatively low temperatures to form larger particles. Such particles are, however, extremely friable. I have found they may be fused together by an exposure to high temperatures in the region, for iron particles for example, of from about 1300° F. to 2000° F., depending on the purity of the iron and other variables. It is important, however, that these temperatures be attained in the reducing atmosphere so that the iron or other metal remains in an unoxidized state.

In order to prevent the sintered particles from growing too large and thus requiring regrinding, I remove them from the high temperature zone by making use of the classification phenomenon characteristic of fluidized beds of powdered solids. This separation is aided by providing higher gas velocities in the lower portion of the zone to prevent the smaller particles from dropping therein.

The main object of the present invention, therefore, is to employ the hydrocarbon synthesis process employing powdered iron as the catalyst, by treating the iron to render it readily fluidizable.

An important object of the invention is to convert disintegrated catalyst fines into larger size particles by a procedure which will not affect the activity of the catalyst nor permit it to be converted to compounds unsuitable for use in the said synthesis.

A further object of the present invention is to convert extremely small size iron particles into particles of a size in which they may be readily fluidized, and at the same time to provide means for readily separating the formed coarse particles from the fines by a procedure which is both efficient and economical.

Another object of the invention is to rework iron catalyst fines to agglomerates readily fluidizable without grinding.

Other and further objects of the invention will appear as the description of the process proceeds.

In the accompanying Fig. I I have shown diagrammatically a form of apparatus which will serve to illustrate a preferred modification of my invention; and in Fig. II I have shown a modification in which the catalyst may be agglomerated by agitation.

Referring in detail to Fig. I, 1 represents a hydrocarbon synthesis fluid reactor which consists essentially of a cylindrical shell having a conical base and a convex crown. Disposed within the reactor is a screen or grid 2, and above the screen is the mass of fluidized powdered iron catalyst which, as stated, preferably has a particle size within the range of from 10 to 200 microns with over 65% having a particle size greater than 20 microns. A gas stream containing carbon monoxide and hydrogen, suitably proportioned, enters the system through line 3 and is then pumped by pump 4 into the bottom of the reactor, below the grid 2 and is thereafter forced upwardly through said grid or screen, the purpose of the latter being to aid in distributing the gas uniformly into contact with the catalyst. The gas and/or vapors in the reaction zone flow upwardly at a controlled rate, such as from about 0.25 to 3 feet per second superficial velocity, with about ½ to 1½ feet per second preferred. The effect of thus operating is to form the before-mentioned fluidized bed, which may also be described as a dense, turbulent, ebullient mass of powder and gasiform material. The very important characteristic of fluid bed catalyst is that, due to the intimate mixing of the portions of the catalyst, very uniform temperatures prevail throughout the bed. This is true even when the bed has a depth of 12 to 15 or more feet and is 8 to 10 feet in diameter. However, the bed of powdered catalyst must be well fluidized in order to attain this desirable condition. I shall presently disclose a means for achieving this end. Depending on the amount of catalyst present in the reaction zone and the gas velocities, the fluidized mass will have an upper dense phase level at some point L which is preferably well below the top of the reactor.

Above the dense phase, there will be a dilute phase with the catalyst concentration decreasing upwardly since, in order to minimize the necessity for providing solids-separating devices, it is desirable to effect separation of the catalyst from the gasiform material to as great an extent as possible within the reactor. And, as stated, this may be accomplished by limiting the quantity of catalyst present in the reactor and thus providing a catalyst disengaging zone in the upper portion thereof. The gasiform material containing the reaction products issues from the upper portion of the dense phase into the dilute phase, and then the said gasiform material is forced through a plurality of solids separating devices S, colloquially referred to as "cyclones," which in fact are the well-known devices for separating dust or other fine particles from the gas by centrifugal force.

The separated catalyst is returned to the dense phase through a plurality of dip pipes in communication with the several cyclones. The gasiform product eventually issues from the reaction zone through line 5, substantially freed of entrained catalyst. If, however, it still contains particle fines, these may be removed by various methods such as by passing it through additional mechanical separating devices, through filters, or by scrubbing the vapors with a liquid. This additional catalyst removing equipment is indicated in the drawing at 6. The product finally substantially freed of all catalyst is withdrawn from the device or devices 6 through line 7 and delivered to a purification and recovery system where it is subjected to cooling, settling, fractional distillation, etc., according to conventional methods to recover gasoline, gas oil, oxygenated hydrocarbons and other desired products. It will not be necessary to describe the purification and recovery system in detail, for those familiar with this art will understand how this may be accomplished and will further understand that unreacted hydrogen and carbon monoxide may be recycled to line 3 together with, perhaps, some associated carbon dioxide, steam or water, and normally gaseous hydrocarbons.

Referring to reactor 1, the conditions necessary for good results have been disclosed by others previously and do not, per se, go the the heart of my invention. It will simply be stated at this point that the process is operated in the range of from 450° F. to 750° F., under superatmospheric pressure up to 400 to 600 pounds per square inch, with the hydrogen to carbon monoxide ratio in the feed gas being proportioned within the limits of ½ to 2 mols of hydrogen per mol of carbon monoxide, with about 1.5 mols of hydrogen per mol of carbon monoxide giving good results. The ratio of carbon dioxide and/or steam with respect to the total of hydrogen and carbon monoxide will vary depending upon numerous factors. In general, an excess of carbon dioxide tends to form unduly large quantities of carbonaceous deposits on the catalyst, and, while steam or water tends to repress this deleterious effect of the carbon dioxide, its use must also be limited for it tends to interfere with the catalyst activity.

As previously stated, it has been found that carbonaceous deposition on the catalyst occurs and that this carbonaceous material causes the catalyst to undergo physical disintegration, which in turn interferes with the proper fluidization of the said catalyst and the maintenance of it in a well-fluidized dense mass in the reaction zone, characterized by substantially homogeneous temperatures throughout, a non-surging upper dense phase level, the absence of "hot spots" and severe pressure drops.

In order to maintain the catalyst in the well-fluidized state, I withdraw the catalyst from a standpipe 8, carrying gas taps 9 through which a fluidizing gas is injected in small currents to aid in causing the catalyst to flow downwardly in pipe 8 without plugging or bridging and discharge the withdrawn catalyst into a sintering vessel 10. The rate of discharge of catalyst from reactor 1 to sintering vessel 10 is controlled by a valve 11. The vessel 10, as shown, consists of an upper expanded cylindrical portion and a lower portion of more restricted cross-sectional area. The catalyst is formed into a dense, fluidized mass in sintering vessel 10, maintained in this state by the same method employed in vessel 1, that is, by controlling the superficial velocity of gas which is discharged into the bottom of the sintering section through line 12 and passes through a distributing means 13 into the fluidized mass, where it passes upwardly therethrough at a superficial velocity of ¼ to 3 feet per second, causing burning of the carbonaceous deposits on the catalyst and raising the temperature of the latter to from about 1300° F. to 2000° F. During this process, not only is the carbonaceous material consumed but the very fine particles which are extremely friable, even after exposure to the temperature stated, undergo a sort of incipient fusion which causes them to agglomerate to particles of larger size. However, in spite of the fact that air is present in the sintering section 10, a reducing atmosphere is maintained by the introduction of a reducing gas into the bottom of the lower restricted and elongated zone 14 of the vessel 10. This gas may be normally gaseous hydrocarbons such as methane or butane or may be some other gas such as hydrogen. The temperature in the zone 14, which is cooled by the gases entering through 16, should never exceed a temperature of about 1300° F. The gases employed in vessel 10 may be withdrawn through line 17.

An important feature of my invention is that I effect a classification of the powdered iron, the finer particles being concentrated in the upper expanded portion of the sintering vessel, while the coarser particles which have undergone agglomeration through sintering descend into the lower, more restricted portion. This classification is aided by the different superficial velocities of the gases in the upper portion and the lower portion of the sintering vessel. In other words, in the upper portion the gas velocities are from 0.3 to 1 foot per second, while in the lower portion they are of the order of from 1 to 3 feet per second. The heavier particles thus separated may without grinding be returned to the reaction zone since they will not be agglomerated to sizes too large for good fluidizing capabilities.

Instead of providing heat by burning the coke or the catalyst in the sintering zone, this may be accomplished by short wave or inductive means. Preferably, also, the vessel should be provided with coils, or jacketed, and the coils or jacket should contain a cooling medium so as to control temperature.

The sintered material is withdrawn from the bottom of the sintering vessel through line 15 and returned to the reaction zone pneumatically or otherwise.

I have found that I may withdraw the fine particles from the reaction zone and subject them to a sintering operation at a temperature within the range of from 1300° F. to 2000° F. for a short period of time. It is important that these temperatures be attained in a reducing atmosphere so that the iron or other metal catalyst remains in an unoxidized state.

In order to prevent the sintered particles from growing too large, and therefore requiring grinding, I remove them from the high temperature zone by making use of the classification phenomenon observed in fluidized beds of solids and gasiform material. This is employed by providing higher gas velocities in the lower zone of the drawing as shown, to prevent the small particles from dropping therein. These conditions are set forth in the following example:

In a process where it is desired to sinter 1.5 tons per hour of catalyst fines having a size below 20 microns at 1700° F. in a vessel 20 feet in diameter in the sintering section and 3 feet in diameter in the quenching or collecting zone, superficial gas velocities of 0.2 feet per second and 1 foot per second are desired in the sintering and quenching zones respectively. Pertinent rates of flow for this operation are as follows:

| | | |
|---|---|---|
| Gas rate in sinter section | SCF/H [1] | 54,500 |
| Gas rate in quench section | SCF/H | 12,500 |
| Heat requirement—600 to 1700° F | B. t. u./Hr | 2,204,000 |
| Fuel at 800 B. t. u./CF to CO and H₂O | SCF/H | 2,755 |
| Remaining gas to bottom (quench) | SCF/H | 9,745 |
| Air required for combustion (to sinter section) | SCF/H | 19,700 |
| Gaseous products of combustion | SCF/H | 22,455 |
| Additional inert or fuel gas to sinter section | SCF/H | 32,045 |
| Heat removed from catalyst in quench section | B. t. u./Hr | 1,320,000 |
| Heat absorbed by fuel gas at 100° F | B. t. u./Hr | 164,500 |
| Heat to be removed by water coils | B. t. u./Hr | 1,155,500 |
| Area required at 10,000 heat density | Sq. Ft | 115 |

[1] Standard cubic feet per hour.

The catalyst size may be adjusted by changing the flow of additional inert or fuel gas to the sinter section thereby adjusting the superficial gas velocity in that section.

Another aspect of my invention involves first subjecting the catalyst fines to agitation, either mechanically or pneumatically, whereupon the fines tend to agglomerate. I am not certain what force causes the fines to agglomerate upon mere agitation, but I have observed that this occurs. These fines containing carbonaceous deposits and formed into an agglomerate, which agglomerate is not of great mechanical strength, may then be subjected to sintering according to the method I have previously described, whereupon the carbon is removed and the strength of the agglomerates formed by the previous agitation is greatly increased.

A preferred method of accomplishing the original agglomeration which precedes the sintering is to discharge the catalyst fines into a tower or other confined space and force a stream of gas upwardly through the mass of powder at a low velocity. I have found that the best velocities to accomplish this purpose are between 0.5 and 1 foot per second. The agglomeration of the catalyst fines proceeds rapidly and the agglomerates, in the form of small spheres, settle to the bottom of the partially fluidized bed whence they may be withdrawn and, as stated, subjected to resintering.

Referring to Fig. II, 20 represents a feed hopper containing catalyst withdrawn from a hydrocarbon synthesis reaction. This catalyst is in the form of a dense fluidized mass having an upper level at $L_1$. A fluidizing gas is introduced into the bottom of the hopper 20 through line 21 for the purpose of maintaining the catalyst in a fluidized condition. This gas is preferably an inert gas and the catalyst in the hopper 20 may be maintained at a temperature somewhere within the range of from 600–700° F. After agglomeration of the catalyst in vessel 20, it is withdrawn through line 22, controlled by a valve 23, and discharged through the top of an elongated tower where it is formed into a disperse phase. This tower is surrounded with a jacket 24 and gas introduced through line 25 is burned in the said jacket in order to maintain a temperature of from 1200 to 1800° F. Hot air and/or gas is introduced into the tower 23 at the bottom thereof through line 26 and this hot air or gas causes the catalyst to undergo sintering wherein the carbonaceous material on the catalyst is burned. The sintered catalyst descends through the tower, is cooled at the exit with cold air introduced through line 27, and is eventually discharged into a stream of inert gas 28 and conducted to the synthesis reactor for further use in the process.

In Fig. II, therefore, the process is one in which the catalyst fines from the synthesis reactor are subjected to agitation in order to cause agglomeration thereof. In the modification which I have shown this agglomeration takes place while the catalyst is in dense phase suspension. The catalyst thus agglomerated by agitation is then discharged into a sintering zone where it is subjected to the influence of an oxygen-containing gas and sufficiently high temperature to cause combustion of the carbonaceous material on the catalyst and further agglomeration. In this modification, as in the modifications described in connection with Fig. I, the catalyst may be returned to the reactor without further grinding.

Instead of subjecting the catalyst fines to agitation by means of a gas, the agglomeration may be effected by mechanically agitating the catalyst, whereupon an agglomeration occurs.

In the sintering operations I withdraw the agglomerates and subject them to heat and oxidation so that the carbon is burned off and the remaining iron is heated to a temperature to cause sintering of the catalyst to form a single particle from the agglomerate. These particles may be controlled in size by controlling the size to which the original agglomerates are allowed to grow. Control of the sintering temperature will also govern particle size.

Of course, the conditions prevailing in the reaction zone in which the hydrocarbon synthesis occurs will govern the desired size of the particles returned to the reactor, but in general particles in the range of 50 to 200 microns will be the preferred size of the material returned to the reactor.

Having described the nature and purpose of my invention, what is claimed is:

1. The method of synthesizing hydrocarbons and oxygenated hydrocarbons in a reaction zone containing a body of finely divided iron catalyst, which catalyst is in a fluidized state, and to which reaction zone is fed a synthesis gas containing hydrogen and carbon monoxide and is further characterized in that the reaction zone is maintained under synthesizing conditions of temperature and pressure, the improvement comprising maintaining the particle size of the iron catalyst in a fluidizable range by withdrawing catalyst which has undergone physical disintegration due to the forces accompanying carbonaceous deposit thereon, subjecting the withdrawn catalyst to sintering temperatures in a reducing atmosphere in a sintering zone while the catalyst is in the form of a fluidized mass to cause finer particles of iron to agglomerate to form coarser particles of fluidizable size, thereafter separating the finer particles from the coarser particles by aeriform classification, withdrawing the said coarser particles of fluidizable size from said sintering zone, cooling said sintered coarse catalyst in a quenching zone, and immediately returning said coarser particles without grinding to the reaction zone.

2. The method of claim 1 in which the sintering operation is carried out at a temperature within the range of from 1300 to 2000° F.

ROBERT W. KREBS.

REFERENCES CITED

The following references are of record in the file of this patent:

UNITED STATES PATENTS

| Number | Name | Date |
| --- | --- | --- |
| 2,183,146 | Michael | Dec. 12, 1939 |
| 2,360,787 | Murphree | Oct. 17, 1944 |
| 2,393,554 | Ogorzaly | Jan. 22, 1946 |